Patented Oct. 13, 1936

2,056,972

UNITED STATES PATENT OFFICE 2,056,972

PURIFICATION OF ETHER

William A Lott, Newark, N. J., assignor to E. R. Squibb & Sons, New York, N. Y., a corporation of New York No Drawing. Application September 30, 1932, Serial No. 635,601

2 Claims. (Cl. 260—151)

This invention relates to the purification of ether.

Aldehydes form in ether during its manufacture (as by the oxidation of ethyl alcohol in the presence of sulfuric acid) and subsequently (by the decomposition of peroxide), and constitute an impurity that tends to make the ether unfit for anesthetic use.

It is the object of this invention to provide an efficient method of purifying ether so as to remove therefrom aldehydes and/or other impurities, particularly unsaturated compounds.

In the practice of this invention, ether containing impurities, especially aldehydes and/or unsaturated compounds, is contacted with mercuric oxide, preferably an aqueous suspension of freshly prepared mercuric oxide.

The ether treated may be in the liquid or the vapor state; the contact should be thorough, and may be effected by mixing the liquid ether with the contact substance or passing the ether vapor through suitable scrubbing towers; and where the ether vapor is treated, preliminary dephlegmation thereof is desirable to remove the large proportion of alcohol vapor, and thereby to prolong the active life of the contact substance, and the temperature in the mercuric oxide scrubber should be kept sufficiently high to prevent the ether from condensing, but not much higher.

By employing the method of this invention it is possible to reduce aldehydes in ether from a proportion many times in excess of that ordinarily found in anesthetic ether, to less than one part of aldehyde in a million parts of ether, and/or to remove any unsaturated compounds and other impurities that may be present.

As an example, 1500 cc. of liquid ether is agitated, so as to obtain intimate contact between the two phases, with a freshly prepared suspension of mercuric oxide made by adding 500 cc. of aqueous mercuric chloride solution to a solution of 17 grams of potassium hydroxide in 600 cc. of water; and the mixture is allowed to stand until the ether separates as a clear supernatant liquid. This ether gives a negative test for aldehydes even though the mercuric chloride used has been as little as 0.31 gram (larger proportions thereof, of course, being effective also).

As a further example, ether vapor from the still (containing, among other impurities, alcohol vapor and acidic materials) is passed through a mercuric oxide suspension prepared by adding 400 cc. of water containing 20 grams of mercuric chloride to 3600 cc. of 37% sodium hydroxide maintained at above 80° C. (to prevent accumulation of alcohol in the contact mixture) but not much thereabove (otherwise the life of the contact mixture is curtailed). On being condensed after removal of the alcohol by dephlegmation, the ether gives a negative test for aldehydes.

Preferably, however, the process is applied to ether vapor that has already been alkali-scrubbed and dephlegmated and is ready to be condensed. Thus, ether vapor is rendered aldehyde-free by passage, with mechanical agitation to insure efficient contact, through a fresh mercury oxide suspension prepared by adding 500 cc. of a solution containing as little as 0.31 gram of mercuric chloride, to a solution of 17 grams of potassium hydroxide in 600 cc. of water and 50 cc. of 10% sodium carbonate solution.

As a still further example, ether vapor is bubbled through a series of scrubbers in each of which, for maximum dispersion, the mercury oxide has been precipitated upon milk of magnesia. Specifically, 350 cc. of 39% sodium hydroxide solution diluted with 2000 cc. of water is added with agitation to a suspension of mercuric oxide made by adding 400 cc. of 5% mercuric chloride solution to 500 cc. of milk of magnesia diluted with 750 cc. of water. In each of four 500-cc. gas-washing bottles 300 cc. of this contact mixture is introduced; and the bottles are so connected that the ether vapor will enter at the bottom of each, pass through its contact mixture, and proceed to the next. Uncondensed alkali-scrubbed and dephlegmated ether vapor is now passed through the series of bottles at a temperature of between 40° and 50° C. at a rate of between 2 and 3 cc. of condensed ether a minute. Ether thus treated gives a negative test for aldehydes.

It is to be understood that the foregoing examples are merely illustrative and by no means limitative of the invention, which may be variously otherwise embodied—for instance, as to the procedures and apparatus employed—within the scope of the appended claims.

I claim:—

1. The method of purifying ether that comprises dephlegmating the ether, to remove alcohol therefrom, and then contacting it with mercuric oxide.

2. The method of purifying ether that comprises dephlegmating the ether, to remove alcohol therefrom, and then contacting it with an aqueous suspension of freshly prepared mercuric oxide.

WILLIAM A. LOTT.